(12) United States Patent
Yoshida et al.

(10) Patent No.: US 6,235,825 B1
(45) Date of Patent: May 22, 2001

(54) POLYLACTIC ACID RESIN COMPOSITION AND FILM THEREFROM

(75) Inventors: Yasunori Yoshida; Shoji Obuchi; Yasuhiro Kitahara; Takayuki Watanabe; Hisashi Aihara; Tomoyuki Nakata; Kazuhiko Suzuki; Masanobu Ajioka, all of Kanagawa (JP)

(73) Assignee: Mitsui Chemicals, Inc. (JP)

( * ) Notice: Subject to any disclaimer, the term of this patent is extended or adjusted under 35 U.S.C. 154(b) by 0 days.

(21) Appl. No.: 09/402,882

(22) PCT Filed: Mar. 5, 1999

(86) PCT No.: PCT/JP99/01074

§ 371 Date: Oct. 14, 1999

§ 102(e) Date: Oct. 14, 1999

(87) PCT Pub. No.: WO99/45067

PCT Pub. Date: Sep. 10, 1999

(30) Foreign Application Priority Data

Mar. 5, 1998 (JP) ................................................. 10-053684
Mar. 5, 1998 (JP) ................................................. 10-053685

(51) Int. Cl.⁷ ..................................................... C08K 5/11

(52) U.S. Cl. ............................ 524/314; 524/556; 523/124
(58) Field of Search ..................................... 524/269, 314, 524/556; 523/124

(56) References Cited

U.S. PATENT DOCUMENTS 5,753,782 * 5/1998 Hammond et al. ................... 525/450
5,866,634 * 2/1999 Tokushige et al. ................... 523/124

* cited by examiner

*Primary Examiner*—Kriellion Sanders
(74) *Attorney, Agent, or Firm*—Burns, Doane, Swecker, & Mathis, L.L.P.

(57) ABSTRACT

A polylactic acid-based resin composition composed of a high molecular ingredient (A) comprising polylactic acid (a1) and an aliphatic polyester (B), and a film, particularly an inflation film, prepared from the resin composition. The film comprising the polylactic acid-based resin composition of the invention is biodegradable and excellent in flexibility and resistance to blocking of film and bleeding-out of plasticizer, has no anisotropy in tear strength, and can be suitably used for an agricultural multi-film and garbage bag. When the film of the invention is used for food wrapping, the film prevents fungus growth and contamination of color or odor, and thus can be suitably used.

29 Claims, No Drawings

POLYLACTIC ACID RESIN COMPOSITION AND FILM THEREFROM

TECHNICAL FIELD

The present invention relates to a polylactic acid-based resin composition and a film comprising the composition. More specifically, the invention relates to a polylactic acid-based resin composition and a film comprising the composition which are excellent in flexibility and thermal resistance and are further dominant in degradability in compost after use.

BACKGROUND ART

Conventionally, polyethylene, polypropylene, flexible polyvinyl chloride and polyethylene terephthalate and other resins have been known to have excellent flexibility, thermal resistance and water resistance. These resins have been used for garbage bags and packaging bags. However, these resins increase an amount of refuse when disposed after use and furthermore, are scarcely degradable in the natural environment. Thus, these resins semi-permanently remain underground even after burial disposal. These dumped plastics have also led to problems such as impairment of a general view and damage of life environment of marine organisms.

On the other hand, polylactic acid, a copolymer of lactic acid and other aliphatic hydroxycarboxylic acid and polyester derived from aliphatic polyhydric alcohol and aliphatic polybasic acid have been known to have thermoplastic property and biodegradability. Application of these polymers to various uses has been developed.

In these polymers, polylactic acid in particular is completely biodegraded in an animal body in a period of several months to one year. When placed in soil or sea water, these polymers initiate degradation within several weeks in a moist environment and disappear in a period of one to several years. The degradation products are characterized by lactic acid, carbon dioxide and water, which are harmless to the human body.

Further, polylactic acid is expected in recent years to extend its application field because the raw material L-lactic acid can be inexpensively produced in a large scale by a fermentation process, degradation velocity of polylactic acid is high in the compost, and polylactic acid is excellent in resistance to fungus and protection of foods from contamination of odor and color.

However, polylactic acid has high rigidity and is thus unsuited for agricultural multi-films, food packaging bags, garbage bags and other film and packaging uses which require flexibility in particular.

As an example of flexible and biodegradable resin, an inflation film prepared from polybutylene succinate has a large anisotropy in tear strength between longitudinal and transverse directions and is characterized in very weak longitudinal tear strength. Low tear strength and its anisotropy lead to problems depending upon uses. Thus, inflation films of polybutylene succinate are also unsuitable for uses in an agricultural multi-film, food packaging bag, garbage bag and other films or wrapping materials.

Generally known techniques for making resin flexible are (1) addition of plasticizer, (2) copolymerization and (3) blending of flexible polymers. However, the techniques (1) and (2) lower the glass transition temperature of the resin composition, even though sufficient flexibility can be provided. As a result, change of physical properties such as increase in crystallinity and rigidity is found under conventional environmental temperature. Additionally, use of plasticizer leads to a problem of bleeding of the plasticizer. Thus, various problems are substantially encountered for putting these techniques to practical use.

On the other hand, in the technique (3), the resin to be blended is restricted to biodegradable resin having flexibility in view of the biodegradability which is one of the subject of the invention. Such resins include, for example, polybutylene succinate, polyethylene succinate, and polycaprolactone. These resins have been disclosed in Japanese Laid-Open Patent HEI 8-245866 and HEI 9-111107. However, in order to provide sufficient flexibility (an elastic modulus of 1,000 MPa or less) for polylactic acid, the technique requires the addition of a large amount of the resin, for example, 60% by weight or more polybutylene succinate. As a result, the above characteristics of polylactic acid are impaired.

Polylactic acid has less anisotropy in tear strength as compared with polybutylene succinate. In the realities, conventional techniques cannot provide a biodegradable film having flexibility and thermal resistance without impairing characteristics of polylactic acid and further having no anisotropy in tear strength.

Consequently, the subject to be solved by the invention is to provide a biodegradable film characterized by having flexibility and thermal resistance in combination without anisotropy in tear strength.

More specifically, the object of the invention is to provide a biodegradable film having excellent thermal resistance and no anisotropy in tear strength, as a result of excellent flexibility like polypropylene, polyethylene and polyvinyl chloride which are used for garbage bags, packaging materials and outstanding resistance to blocking of film and bleeding out of plasticizer at high temperature.

DISCLOSURE OF THE INVENTION

As a result of an intensive investigation on polylactic acid in order to achieve the above subject, the present inventors have found a film comprising a polylactic acid-based resin composition obtained by mixing polylactic acid with specific flexible aliphatic polyester and blending the resultant mixture with a biodegradable plasticizer having good compatibility with the resultant mixture. Thus, the invention has been completed.

That is, the first object of the invention is a polylactic acid-based resin composition comprising 100 parts by weight of a high molecular ingredient (A) which contains 50 to 90% by weight of polylactic acid (a1) and 10 to 50% by weight of a biodegradable aliphatic polyester (a2) having a melting point of 80 to 250° C., and 5 to 25 parts by weight of a biodegradable plasticizer (B).

The second aspect of the invention is a flexible polylactic acid-based resin film, specifically an inflation film of a polylactic acid-based resin, which comprises a polylactic acid-based resin composition composed of 100 parts by weight of high molecular ingredient (A) which contains 50 to 90% by weight of polylactic acid (a1) and 10 to 50% by weight of a biodegradable aliphatic polyester (a2) having a melting point of 80 to 250° C., and 5 to 25 parts by weight of a biodegradable plasticizer (B), wherein the film has an elastic modulus of 200 to 1,000 MPa and longitudinal/transverse ratio of 0.8 to 1.2 in tear strength, leads to neither plasticizer bleeding nor film blocking at 60 to 120° C., and is excellent in resistance to blocking and bleeding-out at high temperature.

The third aspect of the invention is a preparation process of a flexible polylactic acid-based resin film having excellent resistance to blocking and bleeding-out at high temperature characterized by inflation-molding a polylactic acid-based resin composition, wherein a high molecular ingredient (A) comprises 50 to 90% by weight of polylactic acid (a1) and 10 to 50% by weight of a biodegradable, aliphatic polyester (a2) having a melting point of 80 to 250° C., and the amount of a biodegradable plasticizer (B) is 5 to 25 parts by weight for 100 parts by weight of said high molecular ingredient (A), under processing conditions of 150 to 220° C. in resin extrusion temperature and 1.5 to 3.0 in a film blow-up rate.

BEST MODE FOR EMBODYING THE INVENTION

The present invention will hereinafter be illustrated in detail.

[Flexible Film]

The term "flexible film" in the invention refers to a film having an elastic modulus in the range of 200 to 1,000 MPa in accordance with JIS K-6732. The flexible film can be suitably used for agricultural multi-film, food packaging bags and garbage bags. When the elastic modulus exceeds 1,000 MPa, the film has lower flexibility and becomes rigid.

[Film Having Resistance of Film to Blocking and Bleeding-Out at High Temperature]

The term "resistance of film to blocking and bleeding-out at high temperature" in the invention refers to a property which does not cause bleeding-out of a plasticizer and accompanied blocking between films in the range of 60 to 120° C.

When a plasticizer is added, bleeding-out, a phenomenon of exuding the plasticizer from a formed article, is sometimes observed. The bleeding-out of the plasticizer tends to occur with increase in temperature. Thus, when a plasticized film has no bleeding-out of the plasticizer at higher temperature, the film can be used in a broader range of temperatures, which means excellent thermal resistance.

[Tear Strength and Anisotropy]

The tear strength of a film in the invention is evaluated in accordance with JIS P8116 and is converted to a value obtained by superposing 16 sheets of films having a thickness of 30 $\mu$m. The term "anisotropy" refers to a property which differs in tear strength between longitudinal and transverse directions, and is represented by a longitudinal/transverse ratio of tear strength. For example, an inflation film prepared from polybutylene succinate has very low tear strength in the transverse direction and thus has a great anisotropy.

Additionally, the longitudinal direction of a film in the invention means the direction parallel to the direction of resin flow from the extrusion die, and the transverse direction means the direction perpendicular to the direction of resin flow from the extrusion die.

[Polylactic Acid-Based Resin Composition]

The polylactic acid-based resin composition in the invention comprises a biodegradable high molecular ingredient (A) which contains 50 to 90% by weight of polylactic acid (a1) and 10 to 50% by weight of a biodegradable, aliphatic polyester (a2) having a melting point of 80 to 250° C., and 5 to 25 parts by weight of a biodegradable plasticizer (B) for 100 parts by weight of said biodegradable high molecular ingredient (A).

[Polylactic Acid (a1)]

Specific examples of lactic acid which is the raw material of polylactic acid in the invention include L-lactic acid, D-lactic acid, DL-lactic acid, a mixture thereof, and lactide which is a cyclic dimer of lactic acid. However, when a mixture of L-lactic acid and D-lactic acid is used, the resulting polylactic acid must contain 75% by weight or more of L-lactic acid or D-lactic acid.

Representative preparation process of polylactic acid for use in the invention include, for example;

1) Direct dehydration polycondensation process of lactic acid (preparation process disclosed, for example, in U.S. Pat. No. 5,310,865), 2) Ring-opening polymerization process by melt polymerization of lactide, that is, cyclic dimer of lactic acid (preparation process disclosed, for example, in U.S. Pat. No. 2,758,987), 3) Solid phase polymerization process at least in a portion of the steps for preparing polylactic acid by dehydration polycondensation of lactic acid in the presence of a catalyst.

However, polylactic acid preparation process is not limited to these processes.

Copolymerization can also be carried out in the above processes by addition of a small amount of glycerol and other polyhydric alcohols, butanetetracarboxylic acid and other aliphatic polybasic acids, or polysaccharide and other polyhydric alcohols. Further, molecular weight of polylactic acid can be increased by addition of a chain extender such as diisocyanate.

[Aliphatic Polyester (a2)]

Aliphatic polyester used in the invention is prepared from various combinations of below described aliphatic hydroxycarboxylic acid, aliphatic dihydric alcohol and aliphatic dibasic acid and the polymer thus obtained has biodegradability. However, polylactic acid used in the invention is not included in the above polyester.

Representative hydroxycarboxylic acid which can be used for preparing aliphatic polyester of the invention includes, for example, glycolic acid, lactic acid, 3-hydroxybutyric acid, 4-hydroxybutyric acid, 3-hydroxyvaleric acid, 4-hydroxyvaleric acid and 6-hydroxycaproic acid, and further includes cyclic ester of aliphatic hydroxycarboxylic acid, for example, glycolide which is a dimer of glycolic acid, $\epsilon$-caprolactone which is a cyclic ester of 6-hydroxycaproic acid. These compounds can be used singly or as a mixture.

Specific aliphatic dihydric alcohol which can be used for preparation of aliphatic polyester in the invention includes, for example, ethylene glycol, diethylene glycol, triethylene glycol, polyethylene glycol, propylene glycol, dipropylene glycol, 1,3-butanediol, 1,4-butanediol, 3-methyl-1,5-pentanediol, 1,6-hexanediol, 1,9-nonanediol, neopentyl glycol, polytetramethylene glycol, and 1,4-cyclohexane dimethanol. These compounds can be used singly or as a mixture.

Exemplary aliphatic dibasic acid which can be used for preparation of aliphatic polyester in the invention includes, succinic acid, oxalic acid, malonic acid, glutanic acid, adipic acid, pimelic acid, suberic acid, azelaic acid, sebacic acid, undecanoic diacid and dodecanoic diacid. These compounds can be used singly or as a mixture.

Specific preparation processes of aliphatic polyester in the invention include below described processes;

1) A direct dehydration polycondensation process of aliphatic hydroxycarboxylic acid, for example, the preparation process disclosed in U.S. Pat. No. 5,310,865, 2) A ring-opening polymerization process which polymerizes glycolide or other cyclic dimers of hydroxycarboxylic acid and $\epsilon$-caprolactone in a molten state in the presence of a catalyst, for example, the preparation process disclosed in U.S. Pat. No. 4,057,537, 3) A direct dehydration polycondensation process of a mixture of aliphatic dihydric alcohol and aliphatic dibasic acid, for example, the preparation process disclosed in U.S. Pat. No. 5,428,126, 4) A process for conducting condensation of polylactic acid in the presence of an organic solvent with a polymer derived from aliphatic dihydric alcohol and aliphatic dibasic acid, for example, the preparation process disclosed in EP 0712880-A2.

However, preparation process of aliphatic polyester is not limited to these processes.

Copolymerization can be carried out in the above processes by addition of a small amount of other aliphatic polyhydric alcohol such as glycerol and polysaccharide or other aliphatic polybasic acid such as butanetetracarboxylic acid. Further, molecular weight of aliphatic polyester can be increased by addition of a chain extender such as diisocyanate.

The aliphatic polyester of the invention is satisfactory to use so long as the polyester has biodegradability, and preferred polyester has additionally a melting point of 80 to 250° C. Flexible, aliphatic polyester having crystallizability is preferred in particular. When the melting point of aliphatic polyester is lower than 80° C., the resulting polylactic acid-based resin composition and the film prepared from the composition have lower thermal resistance. On the other hand, the melting point higher than 250° C. leads to higher melting temperature in the pelletizing step and thus unfavorably is liable to cause deterioration and coloring of polylactic acid ingredient. Exemplary preferred aliphatic polyester includes polyethylene oxalate, polybutylene oxalate, polyneopentylglycol oxalate, polyethylene succinate, polybutylene succinate, polyhydroxybutyric acid and copolymer of β-hydroxybutyric acid and β-hydroxyvaleric acid. Polyethylene succinate and polybutylene succinate are preferred in particular.

[Weight Average Molecular Weight (MW) and Molecular Weight Distribution of Polylactic Acid and Aliphatic Polyester]

No particular limitation is substantially imposed in the invention upon the weight average molecular weight (MW) and molecular weight distribution of polylactic acid and aliphatic polyester, so long as processing is possible. The weight average molecular weight (MW) of polylactic acid and aliphatic polyester used in the invention is not limited in particular so long as the exhibited mechanical properties are sufficient. Generally, the weight average molecular weight (MW) is preferably 10,000 to 1,000,000, more preferably 30,000 to 500,000, most preferably 50,000 to 300,000. When the weight average molecular weight (MW) is lower than 10,000, mechanical properties are commonly unsatisfactory. On the other hand, when the molecular weight exceeds 1,000,000, it becomes difficult to handle or unfavorable in economy.

[High Molecular Ingredient (A)]

The high molecular ingredient (A) in the invention can be obtained by addition of aliphatic polyester (a2) to polylactic acid (a1). The object of aliphatic polyester addition is to provide flexibility for polylactic acid and to prevent bleeding-out of plasticizer and resulting film blocking. For 100 parts by weight of the high molecular ingredient (A), the blending amounts are generally 50 to 90 parts by weight of polylactic acid (a1) and 10 to 50 parts by weight of aliphatic polyester (a2), preferably 55 to 85 parts by weight of polylactic acid (a1) and 15 to 45 parts by weight of aliphatic polyester (a2), more preferably 60 to 80 parts by weight of polylactic acid (a1) and 20 to 40 parts by weight of aliphatic polyester (a2). That is, the high molecular ingredient (A) comprises 50 to 90% by weight of polylactic acid and 10 to 50% by weight of aliphatic polyester, preferably 55 to 85% by weight of polylactic acid and 15 to 45% by weight of aliphatic polyester, more preferably 60 to 80% by weight of polylactic acid and 20 to 40% by weight of aliphatic polyester. When polylactic acid exceeds 90% by weight, flexibility becomes insufficient. Even though plasticizer is added in order to obtain flexibility as mentioned below, a large amount of the plasticizer is required an as a result, it occurs problems such as bleeding-out of plasticizer and blocking of films.

On the other hand, when the amount of polylactic acid is less than 50 parts by weight, that is, 50% by weight, polylactic acid tends to lower biodegradability in compost and thus cannot be applied to food packaging bags and other uses for coming into contact with foodstuffs. Further, the film obtained has large anisotropy in tear strength.

[Plasticizer (B)]

Plasticizer must be further added in the invention in order to provide the high molecular ingredient (A) with desired flexibility of less than 100 MPa in elastic modulus. The plasticizer (B) which can be used in the invention is required to have biodegradability and further good compatibility with the high molecular ingredient (A). Representative plasticizers include aliphatic polybasic acid ester, aliphatic polyhydric alcohol ester and oxyacid ester.

Aliphatic polybasic acid ester includes, for example, dimethyl adipate, di(2-ethylhexyl)adipate, diisobutyl adipate, dibutyl adipate, diisodecyl adipate, dibutyldiglycol adipate, di(2-ethylhexyl)adipate, dibutyl sebacate and di(2-ethylhexyl)sebacate.

Aliphatic polyhydric alcohol ester includes, for example, diethylene glycol monoacetate, diethylene glycol diacetate, diethylene glycol monopropionate, diethylene glycol dipropionate, diethylene glycol monobutyrate, diethylene glycol dibutyrate, diethylene glycol monovalerate, diethylene glycol divalerate, triethylene glycol monoacetate, triethylene glycol diacetate, triethylene glycol monopropionate, triethylene glycol dipropionate, triethylene glycol monobutyrate, triethylene glycol dibutyrate, triethylene glycol monovalerate, triethylene glycol divalerate, tracetin and glycerol tripropionate.

Oxyacid ester includes, for example, methyl acetylricinoleate, butyl acetylricinoleate, and acetyltributylcitric acid.

These componds can be used singly or as a mixture. Specifically, triacetin, acetyltributylcitric acid, dibutyl sebacate and triethylene glycol diacetate can be suitably used because of excellent compatibility with the high molecular ingredient (A).

The amount of plasticizer (B) is generally 5 to 25 parts by weight, preferably 7 to 20 parts by weight, more preferably 10 to 18 parts by weight for 100 parts by weight of the high molecular ingredient (A). When the amount of plasticizer is less than 5 parts by weight, plasticizing effect becomes unsatisfactory and desired flexibility cannot be obtained. On the other hand, the amount of plasticizer exceeding 25 parts by weight results in bleeding-out of the plasticizer.

[Additive]

Polylactic acid-based resin composition of the invention can be incorporated depending upon the object such as improvement in tensile, strength thermal resistance and weatherability with various additives such as antioxidant, ultraviolet absorber, thermal stabilizer, flame retardant, internal release agent, inorganic additive, antistatic agent, surface wetting improver, auxiliary incinerator, colorant and lubricant.

For example, in T-die forming, inflation forming and other processing methods of films and sheets, addition of an inorganic additive and lubricant (aliphatic carboxylic acid amide) is recommended in order to improve blocking resistance and sliding property of films and sheets.

Exemplary inorganic additives include silica ($SiO_2$), calcium carbonate, talc, kaolin, kaolinite and zinc oxide. Silica is particularly preferred. These additives can be used singly or as a mixture.

The amount of inorganic additives is generally 0.05 to 15 parts by weight, preferably 0.5 to 10 parts by weight, more preferably 1 to 5 parts by weight for 100 parts by weight of the high molecular ingredient (A). The best amount of addition can be suitably selected so as to obtain good conditions regarding the processability in the film forming step, and blocking resistance and slip characteristics of resulting film and sheet.

Aliphatic carboxylic acid amide for use in a lubricant includes "Aliphatic acid amide" which is described on page 389, right column to page 391, left column in "10889 Chemical Goods" published in 1989 from Kagakukogyon-ippo Co.

Any description in the chapter is regarded as a part of disclosure in the specification of the invention as a result of evidently showing cited references and cited scopes.

In view of the matter and disclosure in the specification of the invention, any matter which can be directly and evidently derived by those skilled in the art from referring to the clearly cited scopes is regarded as disclosure.

Representative compounds of aliphatic carboxylic acid amide include, for example, oleamide, stearamide, erucamide, behenamide, N-oleylpalmitamide, N-stearylerucamide, N,N'-ethylenebisstearamide, ethylenebisoleamide, ethylenebisbehenamide, ethylenebisstearamide, ethylenebislauramide, hexamethylenebisstearamide, butylenebisstearamide, N,N'-dioleylsebacamide, N,N'-dioleyladipamide, N,N'-distearyladipamide, N,N'-distearylisophthalamide, N,N'-distearylteraphthalamide, N-oleyloleamide, N-stearyloleamide, N-stearylerucamide, N-oleylstearamide, N-stearylstearamide, N-butyl-N'-stearylurea, N-propyl-N'-stearylurea, N-alkyl-N'-stearylurea, N-phenyl-N'-stearylurea, N-stearyl-N'-stearylurea, dimethytolloil amide, dimethyllauramide, and dimethylstearamide. Particularly preferred compounds are oleamide, stearamide, erucamide, behenamide, N-oleylpalmitamide and N-stearylerucamide and are used singly or as a mixture.

The amount of aliphatic carboxylic acid amide is generally 0.05 to 10 parts by weight, preferably 0.1 to 7.0 parts by weight, more preferably 0.3 to 5.0 parts by weight, most preferably 0.5 to 3.0 parts by weight for 100 parts by weight of the high molecular ingredient (A). As in the case of inorganic additives, the best amount of addition can be suitably selected so as to obtain good conditions regarding the processability in the film forming step, and blocking resistance and slip characteristics of resulting film and sheet.

[Preparation Process of Polylactic Acid-Based Resin Composition]

The polylactic acid-based resin composition of the invention can be prepared by uniformly mixing the high molecular ingredient (A) comprised of polylactic acid (a1) and aliphatic polyester (a2) with plasticizer (B) and in certain cases in the presence of other additives by using a high velocity or low velocity mixer and successively melt-kneading the resulting mixture with a single- or multi-screw extruder having sufficient kneading capacity.

The usually preferred, shapes of the polylactic acid-based resin composition in the invention are pellet, bar and powder.

[Preparation Process of Film and Sheet]

The polylactic acid-based resin composition of the invention is a suitable material for the preparation of film and sheet. Common preparation equipment of film and sheet can be used without any difficulty. The polylactic acid-based resin composition of the invention can be applied to forming film and sheet by using a forming process, for example, inflation forming, T-die forming, calendering, balloon forming, solvent casting and hot press forming.

Combination of these processes with a co-extrusion method can prepare in a high productivity a multi-layered film consisting of a plurality of polylactic acid-based resin composition of the invention and other species of polymer.

The film or sheet comprising the polylactic acid-based resin composition of the invention can be prepared in the form of roll, tape, cut sheet, plate and seamless bag by setting the conditions of preparation step depending upon the object. The film and sheet comprised of the polylactic acid-based resin composition of the invention are also a suitable material for use in stretch processing, vacuum forming and other fabrications which provide two- or three-dimensional structure.

The film and sheet comprised of the polylactic acid-based resin composition of the invention degrade quickly in a compost, are excellent in fungus resistance and protection of foodstuffs from contamination of odor and color, and thus can be applied to below described various uses.

[Inflation Forming]

The polylactic acid-based resin composition of the invention is a material specifically suited for the preparation of an inflation film. By employing an inflation forming method, the inflation film can be prepared from the polylactic acid-based resin composition of the invention in a high productivity with a relatively low cost. The inflation film has a shape of seamless bag and thus can be suitably used for a taking-out bag in super market, a bag for inhibiting moisture condensation on a pack of refrigerated food and meat from wetting the surrounding, and a compost bag.

The inflation film can be prepared by using common equipment without any trouble. A spiral die is preferably used in order to enhance thickness precision and uniformity of the film. A single screw-extruder is commonly preferred in the forming of the inflation film.

The forming conditions of the inflation film by using the polylactic acid-based resin composition of the invention depend upon the formulation of the polylactic acid-based resin composition and the thickness of the film. In order to obtain desired tear strength, the resin extrusion temperature and blow-up ratio are employed in the below range.

The resin extrusion temperature is generally in the range of 150 to 220° C., preferably 170 to 200° C. When the temperature is less than 150° C., the resin delivered from the die has low temperature, leads to strong orientation in the blow-up step, and causes anisotropy. Extrusion cannot be carried out due to too low temperature in some of the polylactic acid-based resin composition. When the temperature is higher than 220° C., melt viscosity becomes too low, take-up of the film becomes difficult, and the resin is liable to cause heat deterioration.

The resin extrusion temperature is preferably controlled within the range of ±5° C. Insufficient temperature control leads to irregularity in the thickness and strength of resulting inflation films.

The blow-up ratio of inflation film is in the range of 1.5 to 3.0, preferably 2.0 to 2.8. When the ratio is less the 1.5, almost no orientation is applied and the resulting film has a low strength. When the ratio exceeds 3.0, anisotropy becomes greater and the film tends to break in the preparation step.

The inflation film thus obtained in the invention has an elastic modulus of 200 to 1,000 MPa in accordance with JIS K6732, is flexible, has no anisotropy in tear strength and no bleeding of plasticizer at high temperature, and causes no blocking.

A bubble of the molten resin delivered from the die in the forming of a balloon is cooled by a proper method. Air cooling system is preferably used for the polylactic acid-based resin composition.

The cooled bubble is nipped with pinch rolls and generally taken-up into a flat form.

The film of the invention has a tear strength of 20 to 1,000 g both in the longitudinal and transverse directions and the values are converted to the strength superimposed 16 sheets of films having thickness of 30 mμ. The ratio of tear strength in the longitudinal/transverse direction is 0.8 to 1.2 and anisotropy cannot be observed.

[Use of Film and Sheet]

The film and sheet comprised of the polylactic acid-based resin composition can be suitably used for a shopping bag, garbage bag, compost bag, foodstuff and confectionery wrapping film, food wrapping film, cosmetic and perfume wrapping film, medicine wrapping film, crude drug wrapping film, wrapping film of surgical paste applied to stiff shoulder and sprain, agricultural and horticultural film, wrapping film of agricultural chemicals, green house film, fertilizer bag, packaging film for magnetic tape cassette such as video and audio, floppy disk packaging film, engraving film, adhesive tape, common tape, waterproof sheet and sandbag.

The film and sheet of the invention can be suitably used by applying the characteristics for uses requiring degradability in particular.

When foodstuff or confectionery is sealed in a package prepared from the film and sheet of the invention, neither coloration nor contamination of odor is observed. Further, preserving period and relishing period can be greatly extended by inserting an oxygen absorber in the package.

EXAMPLE

The present invention will hereinafter be illustrated in detail by way of example. However, these examples do not limit the scope of the invention.

Following methods were used for measuring the weight average molecular weight (MW) of high molecular ingredient (A), elastic modulus of film, bleed-out of plasticizer, blocking of film, and tear strength, fungus resistance and biodegradability of film.

1) Weight average molecular weight (MW)

Measured by gel permeation chromatography (GPC) using polystyrene reference at column temperature of 40° C. in chloroform solvent.

2) Elastic modulus of film

Measured in accordance with JIS K6732.

3) Plasticizer bleed-out and film blocking

A film was cut into dimensions of 45×30 mm and two sheets of film were superimposed on a glass plate, a metal plate was put on the film, a weight of 500 g was placed on the metal plate and allowed to stand for an hour in a thermohygrostat at 80° C. in 75% RH.

Thereafter, the film was transferred into a desiccator and allowed to stand for 30 minutes at room temperature. Successively, the two sheets of film were peeled off, and presence or absence of film blocking and plasticizer bleed-out were observed.

Film blocking
◯: no blocking
Δ: light blocking
×: heavy blocking
Plasticizer bleed-out
◯: no bleed-out
×: bleed-out was found.

4) Tear strength

The tear strengths in the longitudinal and transverse directions of the film were measure in accordance with JIS P8116.

The tear strength in the Examples and Comparative Examples was converted to the value obtained by superimposing 16 sheets of film having a thickness of 30 mμ.

5) Fungus resistance

A film having dimensions of 5×5 cm was placed on a medium which was previously sterilized and solidified, a spore suspension of following test fungus was spray inoculated and incubated for 6 months in a container at 30° C. The growth state of the test fungus was evaluated.

Test fungus
Aspergilliusniger
Rhizopusoryzae
Penicilliumcitrinium
Cladosporiumcladosporioides
Chaetomiumglobosum
Medium
Inorganic salt agar medium in accordance with JIS Z2911.

| Ammonium nitrate | 3.0 g |
| Potassium phosphate | 1.0 g |
| Magnesium sulfate | 0.5 g |
| Potassium chloride | 0.25 g |
| Ferrous sulfate | 0.002 g |
| Agar | 25 g |

Evaluation method
◯: No growth of fungus is found.
Δ: Fungus growth area is ⅓ or less.
×: Fungus growth area is larger than ⅓.

6) Biodegradability

A press film having dimensions of 10×10 cm and thickness of 100 μm was prepared. The film was buried in a compost having humidity of 60% at 58° C. and time dependent change was observed.

Evaluation
⊙: Degraded and disappeared within 7 days
◯: Degraded and disappeared in a period of 8 to 14 days
Δ: Degraded and disappeared in a period of 15 to 25 days
×: Degraded and disappeared in a period of 26 to 40 days Preparation Example 1

To a thick-walled, cylindrical, stainless-steel polymerization vessel equipped with a stirrer, 400 g of L-lactide, 0.04 g of stannous octate and 0.12 g of lauryl alcohol were charged and deaerated for 2 hours under vacuum. After the vessel was flushed with nitrogen gas, the mixture was heated with stirring at 200° C./10 mmHg for 2 hours.

After finishing the reaction, molten polylactic acid was discharged from the bottom part, cooled in the air and cut into pellet with a pelletizer. The obtained polylactic acid was 340 g (85% yield) and had a weight average molecular weight (MW) of 138,000.

Preparation Example 2

To a reaction vessel equipped with a Dean Stark trap, 10 kg of 90%-L-lactic acid and 45 g of tin powder were charged and heated with stirring for 3 hours at 150° C./50 mmHg while distilling out water. An oligomer was obtained by further heating for 2 hours with stirring at 150° C./30 mmHg. To the oligomer, 21.1 kg of diphenyl ether was added and an azeotropic distillation reaction was carried out at 150° C./35 mmHg. The distilled mixture of water and solvent were separated in the separator and the solvent alone was returned to the reaction vessel. After 2 hours, a column packed with 4.6 kg of molecular sieve 3 A was installed so as to return the solvent to the reaction vessel by way of the column. The reaction was carried out at 130° C./17 mmHg for 20 hours to obtain solution of polylactic acid having a weight average molecular weight of 150,000. The solution was diluted with 44 kg of dehydrated diphenyl ether and cooled to 40° C. Separated crystal was filtrated. To the crystal, 12 kg of 0.5N-HCl and 12 kg of ethanol were added, stirred at 35° C. for an hour, filtered and dried at 60° C./50 mmHg to obtain 6.1 kg of polylactic acid powder (85% yield). The powder was pelletized with an extruder to obtain polylactic acid having a weight average molecular weight of 147,000.

Preparation Example 3

To a reaction vessel equipped with a Dean Stark trap, 50.5 kg of 1,4-butanediol and 66.5 kg of succinic acid and 45 g of tin powder were charged and distilled out water with stirring at 100° C. for 3 hours. An oligomer was obtained by further heating with stirring for 2 hours at 150° C./50 mmHg. To the oligomer, 385 kg of diphenyl ether was added and an azeotropic dehydration reaction was carried out at 150° C./35 mmHg. The distilled mixture of water and the solvent was separated in the water separator and the solvent alone was returned to the reaction vessel. After 2 hours, a column packed with 50 kg of molecular sieve 3 A was installed so as to return the solvent to the reaction vessel by way of the column.

The reaction was carried out at 130° C./17 mmHg for 15 hours to obtain solution of polybutylene succinate having a weight average molecular weight of 140,000. To the solution, 180 kg of dehydrated diphenyl ether was added and the resultant diluted solution was cooled to 40° C. The precipitated crystal was filtrated. To the crystal, 200 kg of 0.5N—HCl and 200 kg of ethanol were added, stirred at 25° C. for an hour, filtered and dried at 60° C./50 mmHg to obtain 91.5 kg of polybutylene succinate (hereinafter referred to simply as PSB1) (94.8% yield). PSB1 had a weight average molecular weight of 138,000.

Examples 1 to 8

Polylactic acid obtained in Preparation Examples 1 and 2 was used as polylactic acid (a1). PSB1 obtained in Preparation Example 3 or BIONOLLE #3001 (PSB2) (manufactured by Showa High Polymer Co. Ltd.) was used as aliphatic polyester (a2). Below described esters were used as plasticizer. $SiO_2$ was used as an inorganic additive. These raw materials were mixed with a Henschel mixer in a proportion shown in Table 1 to obtain a polylactic acid-based resin composition. The composition was pelletized with an extruder at a cylinder temperature of 160 to 210° C. Following plasticizers were used.

ATBC: acetyltributylcitric acid
TEDA: triethylene glycol diacetate
TRAC: triacetin
DBS: dibutyl sebacate The pellet was dried at 60° C. for 10 hours and successively formed into film with a 40 mm inflation forming machine having a die size of 40 mm at resin extrusion temperature of 160 to 170° C. with a blow-up ratio of 2.5 and taken up. The film thus obtained had a lay flat width of 150 mm and a thickness of 30 μm.

The film was measured elastic modulus, bleeding out of plasticizer, blocking, tear strength, fungus resistance and biodegradability. Results are shown in Table 2.

TABLE 1

| | polylactic acid-based resin composition | | | | | | |
|---|---|---|---|---|---|---|---|
| | high molecular ingredient (A) | | | | | | in- |
| | polylactic acid | | polybutylene succinate | | plasticizer | | organic additive |
| Ex. | Prep. Example | weight by parts | species | weight by parts | species | weight by parts | weight by parts |
| 1 | 2 | 80 | PSB1 | 20 | ATBC | 17 | 3 |
| 2 | 2 | 70 | PSB2 | 30 | ATBC | 17 | 3 |
| 3 | 2 | 60 | PSB1 | 40 | ATBC | 13 | 3 |
| 4 | 1 | 60 | PSB2 | 40 | TEDA | 15 | 3 |
| 5 | 1 | 60 | PSB2 | 40 | TRAC | 15 | 3 |
| 6 | 1 | 60 | PSB2 | 40 | DBS | 15 | 3 |
| 7 | 2 | 80 | PSB1 | 20 | ATBC | 17 | 0 |
| 8 | 2 | 70 | PSB2 | 30 | ATBC | 17 | 0 |

TABLE 2

| Ex. | elastic modulus (MPa) | plasticizer bleed-out | film blocking | tear strength (g) longi. | tear strength (g) trans. | ratio longi./trans. | fungus resistance | biodegrad- ability |
|---|---|---|---|---|---|---|---|---|
| 1 | 450 | ○ | ○ | 120 | 120 | 1.0 | ⊚ | ○ |
| 2 | 370 | ○ | ○ | 110 | 120 | 0.9 | ○ | ○ |
| 3 | 420 | ○ | ○ | 65 | 70 | 0.9 | ○ | ○ |
| 4 | 350 | ○ | ○ | 80 | 85 | 0.9 | ○ | ○ |
| 5 | 400 | ○ | ○ | 80 | 85 | 0.9 | ○ | ○ |
| 6 | 410 | ○ | ○ | 80 | 85 | 0.9 | ○ | ○ |
| 7 | 450 | ○ | ○ | 120 | 120 | 1.0 | ○ | ○ |
| 8 | 370 | ○ | ○ | 110 | 120 | 0.9 | ○ | ○ |

Comparative Examples 1 to 16

To a mixture of polylactic acid obtained in Preparation Example 1 and 2 with polybutylene succinate (PSB1) or BIONOLLE #3001 (PSB2), plasticizer and an inorganic additive $SiO_2$ were added in a proportion shown Table 3 and mixed with a Henschel mixer to obtain a polylactic acid-based resin composition. A film was prepared from the resin composition by the same procedures as Examples except that the extrusion temperature of the resin and blow-up ratio were employed as shown in Table 4. Various properties such as elastic modulus, plasticizer bleed-out, film blocking, tear strength, fungus resistance and biodegradability were measured on the resulting films. Results are shown in Table 4.

Following plasticizers were used.
ATBC: acetyltributylcitric acid
LP: liquid paraffin
DOP: dioctyl phthalate
TOTM: trioctyl trimellitate
SE: ethyl stearate
EDO: epoxysoybean oil
PTB: tributyl phosphate

TABLE 3

| | | polylactic acid-based resin composition | | | | | |
|---|---|---|---|---|---|---|---|
| | | high molecular ingredient (A) | | | | | inorganic |
| | | polylactic acid | polybutylene succinate | | plasticizer | | additive |
| Comp. Ex. | Prep. Example | weight by parts | species | weight by parts | species | weight by parts | weight by parts |
| 1 | 1 | 100 | — | 0 | ATBC | 20 | 3 |
| 2 | 2 | 85 | PSB2 | 15 | ATBC | 30 | 3 |
| 3 | 2 | 60 | PSB2 | 40 | — | 0 | 3 |
| 4 | 2 | 60 | PSB2 | 40 | ATBC | 27 | 3 |
| 5 | 1 | 40 | PSB2 | 60 | — | 0 | 3 |
| 6 | — | 0 | PSB1 | 100 | — | 0 | 3 |
| 7 | 2 | 80 | PSB1 | 20 | ATBC | 17 | 3 |
| 8 | 2 | 80 | PSB1 | 20 | ATBG | 17 | 3 |
| 9 | 2 | 80 | PSB1 | 20 | ATBC | 17 | 3 |
| 10 | 2 | 80 | PSB1 | 20 | ATBC | 17 | 3 |
| 11 | 1 | 80 | PSB2 | 20 | LP | 15 | 3 |
| 12 | 2 | 80 | PSB2 | 20 | DOP | 15 | 3 |
| 13 | 2 | 80 | PSB2 | 20 | TOTM | 15 | 3 |
| 14 | 1 | 80 | PSB2 | 20 | SE | 15 | 3 |
| 15 | 1 | 80 | PSB2 | 20 | EDO | 15 | 3 |
| 16 | 1 | 80 | PSB2 | 20 | PTB | 15 | 3 |

TABLE 4

| Comp. Ex. | extrusion temperature (° C.) | blow-up ratio | elastic modulus (MPa) | plasticizer bleed-out | film blocking |
|---|---|---|---|---|---|
| 1 | 160–170 | 2.5 | 750 | X | X |
| 2 | 160–170 | 2.5 | 250 | X | Δ |
| 3 | 160–170 | 2.5 | 1200 | ◯ | ◯ |
| 4 | 160–170 | 2.5 | 180 | X | Δ |
| 5 | 160–170 | 2.5 | 900 | ◯ | ◯ |
| 6 | 160–170 | 2.5 | 300 | ◯ | ◯ |
| 7 | 140–150 | 2.5 | 550 | ◯ | ◯ |
| 8 | 220–230 | 2.5 | film blowing impossible | | |
| 9 | 160–170 | 1 | thickness control difficult | | |
| 10 | 160–170 | 3.5 | 580 | ◯ | ◯ |
| 11 | 160–170 | 2.5 | * | ND | ND |
| 12 | 160–170 | 2.5 | 1500 | X | X |
| 13 | 160–170 | 2.5 | 1600 | ND | ND |
| 14 | 160–170 | 2.5 | 1300 | X | X |
| 15 | 160–170 | 2.5 | 1400 | X | X |
| 16 | 160–170 | 2.5 | 135 | X | X |

| Comp. Ex. | tear strength (g) longi. | tear strength (g) trans. | ratio longi./trans. | fungus resistance | biodegradability |
|---|---|---|---|---|---|
| 1 | 400 | 400 | 1.0 | ◯ | ⊙ |
| 2 | 950 | 990 | 0.9 | ◯ | ⊙ |
| 3 | 25 | 30 | 0.8 | ◯ | ◯ |
| 4 | 810 | 850 | 0.9 | ◯ | ◯ |
| 5 | 15 | 55 | 0.3 | Δ | Δ |
| 6 | 10 | 60 | 0.2 | X | X |
| 7 | 100 | 140 | 0.7 | ◯ | ◯ |
| 8 | film blowing impossible | | | ◯ | ◯ |
| 9 | thickness control difficult | | | ◯ | ◯ |
| 10 | 85 | 160 | 0.5 | ◯ | ◯ |
| 11 | * | * | * | ND | ND |
| 12 | 30 | 40 | 1.3 | ND | ND |
| 13 | 30 | 30 | 1 | X | X |
| 14 | 50 | 60 | 1.2 | ND | ND |
| 15 | 60 | 60 | 1 | ND | ND |
| 16 | 80 | 100 | 1.3 | ND | ND |

*cannot be measured due to poor dispersion of plasticizer
ND: No data

Possibility of Application in Industry

The film, inflation film in particular, comprised of the polyactic acid-based resin composition has biodegradability, is excellent in flexibility, bleeding-out resistance of plasticizer and blocking resistance of film at high temperature, has no anisotropy in a tear strength, and thus can be suitably used for an agricultural multi-films and garbage bags. When the film is used for food wrapping, the film prevents fungus growth and contamination of color and odor and thus can be suitably used for these purposes.

What is claimed is:

1. A polylactic acid-based resin composition comprising 100 parts by weight of an ingredient (A) and 5 to 25 parts by weight of a biodegradable plasticizer (B), wherein said ingredient (A) comprises 55–85% by weight of polylactic acid (a1) having a weight average molecular weight of at least 10,000 and 15 to 45% by weight of a biodegradable aliphatic polyester (a2) having a weight average molecular weight of at least 10,000 and having a melting point of 80 to 250° C.

2. The polylactic acid-based resin composition according to claim 1, wherein the biodegradable aliphatic polyester (a2) is polybutylene succinate.

3. The polylactic acid-based resin composition according to claim 2, wherein the biodegradable plasticizer (B) is one or more plasticizers selected from the group consisting of an aliphatic polybasic acid ester, aliphatic polyhydric alcohol ester and oxyacid acid ester.

4. The polylactic acid-based resin composition according to claim 2, wherein the biodegradable plasticizer (B) is one or more of acetyltributylcitric acid, triacetin, dibutyl sebacate and triethyleneglycol diacetate.

5. A polylactic acid-based resin film comprising a polylactic acid-based resin composition comprising 5 to 25 parts by weight of a biodegradable plasticizer (B) for 100 parts by weight of an ingredient (A) containing 55 to 85% by weight of polylactic acid (a1) having a weight average molecular weight of at least 10,000 and 15 to 45% by weight of a biodegradable aliphatic polyester (a2) having a weight average molecular weight of at least 10,000 having a melting point of 80 to 250° C., having an elastic modulus of 200 to 1,000 MPa and having a longitudinal/transverse ratio of 0.8 to 1.2 in tear strength and which does not exude plasticizer or exhibit blocking at 60 to 120° C.

6. The polylactic acid-based resin film according to claim 5, wherein the tear strength is 20 to 1,000 g both in longitudinal and transverse directions when converted to the value of superimposing 16 sheets of film having a thickness of 30 μm.

7. The polylactic acid-based resin film according to claim 6, wherein the aliphatic polyester (a2) is polybutylene succinate.

8. The polylactic acid-based resin film according to claim 7, wherein the plasticizer (B) is one or more compounds selected from the group consisting of an aliphatic polybasic acid ester, aliphatic polyhydric alcohol ester and oxyacid acid ester.

9. The polylactic acid-based resin film according to claim 7, wherein the plasticizer (B) is one or more compounds selected from the group consisting of acetyltributylcitric acid, triacetin, dibutyl sebacate and triethyleneglycol diacetate.

10. The polylactic acid-based resin film according to claim 9, wherein the film is an inflation film.

11. A process for preparing a polylactic acid-based resin film by inflation-molding a polylactic acid-based resin composition comprising 5 to 25 parts by weight of a biodegradable plasticizer (B) for 100 parts by weight of an ingredient (A) containing 55 to 85% by weight of polylactic acid (a1) having a weight average molecular weight of at least 10,000 and 15 to 45% by weight of a biodegradable aliphatic polyester (a2) having a weight average molecular weight of at least 10,000 and having a melting point of 80 to 250° C., at resin extrusion temperature of 150 to 220° C. with a blow-up ratio of 1.5 to 3.0.

12. The process for preparing a lactic acid-based resin film according to claim 11, wherein the aliphatic polyester (a2) is polybutylene succinate.

13. The process for preparing a lactic acid-based resin film according to claim 12, wherein the plasticizer (B) is one or more compounds selected from the group consisting of an aliphatic polybasic acid ester, aliphatic polyhydric alcohol ester and oxyacid acid ester.

14. The process for preparing a lactic acid-based resin film according to claim 12, wherein the plasticizer (B) is one or more compounds selected from the group consisting of acetyltributylcitric acid, triacetin, dibutyl sebacate and triethyleneglycol diacetate.

15. The polylactic acid-based resin composition according to claim 1, wherein the biodegradable plasticizer (B) is one or more plasticizers selected from the group consisting of an aliphatic polybasic acid ester, aliphatic polyhydric alcohol ester and oxyacid acid ester.

16. The polylactic acid-based resin composition according to claim 1, wherein the biodegradable plasticizer (B) is one or more of acetyltributylcitric acid, triacetin, dibutyl sebacate and triethyleneglycol diacetate.

17. The polylactic acid-based resin film according to claim 5, wherein the aliphatic polyester (a2) is polybutylene succinate.

18. The polylactic acid-based resin film according to claim 17, wherein the plasticizer (B) is one or more compounds selected from the group consisting of an aliphatic polybasic acid ester, aliphatic polyhydric alcohol ester and oxyacid acid ester.

19. The polylactic acid-based resin film according to claim 6, wherein the plasticizer (B) is one or more compounds selected from the group consisting of an aliphatic polybasic acid ester, aliphatic polyhydric alcohol ester and oxyacid acid ester.

20. The polylactic acid-based resin film according to claim 5, wherein the plasticizer (B) is one or more compounds selected from the group consisting of an aliphatic polybasic acid ester, aliphatic polyhydric alcohol ester and oxyacid acid ester.

21. The polylactic acid-based resin film according to claim 17, wherein the plasticizer (B) is one or more compounds selected from the group consisting of acetyltributylcitric acid, triacetin, dibutyl sebacate and triethyleneglycol diacetate.

22. The polylactic acid-based resin film according to claim 6, wherein the plasticizer (B) is one or more compounds selected from the group consisting of acetyltributylcitric acid, triacetin, dibutyl sebacate and triethyleneglycol diacetate.

23. The polylactic acid-based resin film according to claim 5, wherein the plasticizer (B) is one or more compounds selected from the group consisting of acetyltributylcitric acid, triacetin, dibutyl sebacate and triethyleneglycol diacetate.

24. The polylactic acid-based resin film according to claim 8, wherein the film is an inflation film.

25. The polylactic acid-based resin film according to claim 7, wherein the film is an inflation film.

26. The polylactic acid-based resin film according to claim 6, wherein the film is an inflation film.

27. The polylactic acid-based resin film according to claim 5, wherein the film is an inflation film.

28. The process for preparing a lactic acid-based resin film according to claim 11, wherein the plasticizer (B) is one or more compounds selected from the group consisting of an aliphatic polybasic acid ester, aliphatic polyhydric alcohol ester and oxyacid acid ester.

29. The process for preparing a lactic acid-based resin film according to claim 11, wherein the plasticizer (B) is one or more compounds selected from the group consisting of acetyltributylcitric acid, triacetin, dibutyl sebacate and triethyleneglycol diacetate.

* * * * *